(12) United States Patent
Raghav et al.

(10) Patent No.: US 7,856,470 B2
(45) Date of Patent: Dec. 21, 2010

(54) ACCEPTING AN INVITATION SENT TO MULTIPLE COMPUTER SYSTEMS

(75) Inventors: Amritansh Raghav, Seattle, WA (US); Ankur Chavda, Seattle, WA (US); Eran Shtiegman, Redmond, WA (US); Nikhil Bobde, Redmond, WA (US); Parag Samdadiya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1155 days.

(21) Appl. No.: 11/140,539

(22) Filed: May 27, 2005

(65) Prior Publication Data
US 2006/0271635 A1 Nov. 30, 2006

(51) Int. Cl.
*G06F 15/16* (2006.01)
(52) U.S. Cl. ..................................... 709/204
(58) Field of Classification Search .............. 709/204, 709/206
See application file for complete search history.

(56) References Cited

U.S. PATENT DOCUMENTS

| | | | | |
|---|---|---|---|---|
| 5,680,549 | A * | 10/1997 | Raynak et al. | 709/227 |
| 6,430,604 | B1 * | 8/2002 | Ogle et al. | 709/207 |
| 6,731,308 | B1 * | 5/2004 | Tang et al. | 715/751 |
| 6,826,173 | B1 * | 11/2004 | Kung et al. | 370/352 |
| 6,941,345 | B1 * | 9/2005 | Kapil et al. | 709/206 |
| 7,002,912 | B2 * | 2/2006 | Wengrovitz | 370/230 |
| 7,035,923 | B1 * | 4/2006 | Yoakum et al. | 709/224 |
| 7,272,662 | B2 * | 9/2007 | Chesnais et al. | 709/246 |
| 7,280,533 | B2 * | 10/2007 | Khartabil et al. | 370/352 |
| 7,317,716 | B1 * | 1/2008 | Boni et al. | 370/352 |
| 7,383,308 | B1 * | 6/2008 | Groves et al. | 709/206 |
| 7,403,973 | B2 * | 7/2008 | Wilsher et al. | 709/206 |
| 2002/0101446 | A1 * | 8/2002 | Tang et al. | 345/751 |
| 2002/0118809 | A1 * | 8/2002 | Eisenberg | 379/202.01 |
| 2003/0014485 | A1 * | 1/2003 | Banatwala | 709/204 |
| 2003/0018718 | A1 * | 1/2003 | Maehiro | 709/205 |
| 2003/0023690 | A1 * | 1/2003 | Lohtia | 709/206 |
| 2003/0069934 | A1 * | 4/2003 | Garcia-Martin et al. | 709/206 |
| 2003/0105820 | A1 * | 6/2003 | Haims et al. | 709/205 |
| 2003/0131142 | A1 * | 7/2003 | Horvitz et al. | 709/313 |
| 2003/0135569 | A1 * | 7/2003 | Khakoo et al. | 709/206 |

(Continued)

OTHER PUBLICATIONS

Rosenberg et al., SIP: Session Initiation Protocol, RFC 3261, Jun. 2002.*

(Continued)

*Primary Examiner*—Saleh Najjar
*Assistant Examiner*—Robert Shaw
(74) *Attorney, Agent, or Firm*—Perkins Coie LLP

(57) ABSTRACT

A method and system for accepting invitations sent to multiple endpoints for an instant messaging participant is provided. The acceptance system allows multiple endpoints of a participant to be registered at the same time with an instant messaging service. The endpoint of the inviting participant sends an invitation to the instant messaging service indicating that the receiving participant is to be invited to establish a conversation with the inviting participant. When the instant messaging service receives the invitation, it detects that the receiving participant has multiple endpoints registered and forwards the invitation to each registered endpoint. When an endpoint receives the invitation request, it displays an information window asking whether the receiving participant wants to accept the invitation. Upon acceptance, the endpoint sends an acceptance to the endpoint of the inviting participant to establish the conversation between that endpoint and the endpoint of the inviting participant.

16 Claims, 6 Drawing Sheets

U.S. PATENT DOCUMENTS

| | | | |
|---|---|---|---|
| 2003/0135624 A1* | 7/2003 | McKinnon et al. | 709/228 |
| 2003/0217109 A1* | 11/2003 | Ordille et al. | 709/206 |
| 2003/0217142 A1* | 11/2003 | Bobde et al. | 709/224 |
| 2004/0006623 A1* | 1/2004 | Gourraud et al. | 709/227 |
| 2004/0015548 A1* | 1/2004 | Lee | 709/204 |
| 2004/0037406 A1* | 2/2004 | Gourraud | 379/202.01 |
| 2004/0072593 A1* | 4/2004 | Robbins et al. | 455/560 |
| 2004/0078441 A1* | 4/2004 | Malik et al. | 709/206 |
| 2004/0103157 A1* | 5/2004 | Requena et al. | 709/206 |
| 2004/0205175 A1* | 10/2004 | Kammerer | 709/223 |
| 2004/0223485 A1* | 11/2004 | Arellano et al. | 370/351 |
| 2004/0230659 A1* | 11/2004 | Chase | 709/206 |
| 2005/0015495 A1* | 1/2005 | Florkey et al. | 709/227 |
| 2005/0018659 A1* | 1/2005 | Gallant et al. | 370/352 |
| 2005/0044159 A1* | 2/2005 | Niemi et al. | 709/207 |
| 2005/0068166 A1* | 3/2005 | Baker | 340/531 |
| 2005/0080868 A1* | 4/2005 | Malik | 709/207 |
| 2005/0083904 A1* | 4/2005 | Khartabil et al. | 370/351 |
| 2005/0113123 A1* | 5/2005 | Torvinen | 455/519 |
| 2005/0135335 A1* | 6/2005 | Hession et al. | 370/352 |
| 2005/0149620 A1* | 7/2005 | Kirkland et al. | 709/207 |
| 2005/0198589 A1* | 9/2005 | Heikes et al. | 715/805 |
| 2006/0004690 A1* | 1/2006 | Beartusk et al. | 707/1 |
| 2006/0031292 A1* | 2/2006 | Deshpande | 709/204 |
| 2006/0072523 A1* | 4/2006 | Richardson et al. | 370/338 |
| 2006/0075039 A1* | 4/2006 | Narayanaswami et al. | 709/206 |
| 2006/0112177 A1* | 5/2006 | Barkley et al. | 709/224 |
| 2006/0123353 A1* | 6/2006 | Matthews et al. | 715/779 |
| 2006/0146790 A1* | 7/2006 | Caballero-McCann et al. | 370/352 |

OTHER PUBLICATIONS

Roach, Session Initiation Protocol (SIP)-Specific Event Notification, RFC 3265, Jun. 2002.*

Day et al., A Model for Presence and Instant Messaging, RFC 2778, Feb. 2000.*

Day et al., Instant Messaging / Presence Protocol Requirements, RFC 2779, Feb. 2000.*

Lennox/Schulzrinne CPL: A Language for User Control of Internet Telephony Services, draft_ietf-iptel-cpl-00.ps, Feb. 1999.*

Lennox et al., Call Processing Language (CPL): A Language for User Control of Internet Telephony Services, RFC 3880, Oct. 2004.*

Day et al, A Model for Presence and Instant Messaging, RFC 2778, Feb. 2000.*

* cited by examiner

ACCEPTING AN INVITATION SENT TO MULTIPLE COMPUTER SYSTEMS

TECHNICAL FIELD

The described technology relates generally to accepting invitations and particularly to accepting invitations for real-time communications.

BACKGROUND

Real-time conversations between conversation participants via their computer systems are becoming increasingly common. Such real-time conversations require that the participants be present at their computer systems (e.g., personal digital assistants) and able to respond when a communication is received. A common form of real-time conversation is provided by instant messaging services. An instant messaging service allows participants to send messages and have them received within a second or two by the other participants in the conversation. The receiving participants can then send responsive messages to the other participants in a similar manner. To be effective, a real-time conversation relies on the participants' becoming aware of, reviewing, and responding to received messages very quickly. This quick response is in contrast to conventional electronic mail systems in which the recipients of electronic mail messages respond to messages at their convenience.

Instant messaging services require a networking protocol to establish and manage communications between participants. These services may use various mechanisms to establish sessions, such as a "Session Initiation Protocol" ("SIP"). SIP is an application-layer control protocol that computer systems can use to discover one another and to establish, modify, and terminate sessions. SIP is an Internet proposed standard. Its specification, "RFC 3261," is available at <http://www.ietf.org/rfc/rfc3261.txt>. A specification for extensions to SIP relating to event notifications, "RFC 3265," is available at <http://www.ietf.org/rfc/rfc3265.txt>. Both of these specifications are incorporated herein in their entirety by reference.

A SIP network comprises entities that can participate in a dialog as an endpoint, server, or both. SIP supports four types of entities: user agent, proxy server, redirect server, and registrar. User agents initiate and terminate sessions by exchanging messages with other SIP entities. A user agent can be a user agent client, which is generally a computer system that initiates SIP requests, or a user agent server, which is a computer system that generally receives SIP requests and responds to such requests. As examples, "IP-telephones," personal digital assistants, and any other types of computing systems may be user agents. A computer system can be a user agent client in one dialog and a user agent server in another, or may change roles during the dialog. A proxy server is an entity that acts as a server to clients and a client to servers. In so doing, proxy servers intercept, interpret, or forward messages between clients and servers. A redirect server accepts a SIP request and generates a response directing the client that sent the request to contact an alternate network resource. A registrar is a server that accepts registration information from SIP clients and informs a location service of the received registration information.

SIP supports two message types: requests, which are sent from a client to a server, and responses, which are sent from a server to a client, generally when responding to a request. A SIP message is comprised of three parts. The first part of a SIP message is a "start line," which includes fields to indicate a message type and a protocol version. The second part of a SIP message comprises header fields whose values are represented as name-value pairs. The third part of a SIP message is the message's body, which is used to describe the session to be initiated or contain data that relates to the session. Message bodies may appear in requests or responses.

Typical instant messaging services provide a registration server and a presence server. An instant messaging user begins using the instant messaging service by registering an endpoint with the registration server, which can be a SIP registrar. The registration server provides location information about the user to other users of the instant messaging service. Once an instant messaging user is registered, the user sends periodic updates to the presence server specifying the user's current status. The presence server provides information about a user's status to other users that subscribe to a user's presence information.

To start a conversation, an inviting participant typically sends an invitation from an endpoint to the instant messaging service, which then forwards the invitation to one or more endpoints for the receiving participant. The invitation can take place using the SIP INVITE protocol. An endpoint for the receiving participant then accepts the invitation, forming a conversation between the two participants which is typically represented as a conversation window at each participant's instant messaging endpoint. The participants can then each type messages back and forth to each other until the conversation is terminated by either of the participants closing the conversation window.

It is becoming increasingly common for instant messaging participants to have multiple endpoints on which they would like to be available for real-time communications, and to periodically switch from one endpoint to another. For example, a knowledge worker sitting at a desktop computer may leave her desk to attend a meeting to which she takes a laptop where she would like to be available. A person who is away from his computer may have a mobile phone with instant messaging capabilities where he would like to receive real-time communications.

Typical instant messaging services only allow a participant to be available for real-time communications on a single endpoint at a time. If a participant is registered at one endpoint and then registers at another endpoint, typical instant messaging services unregister the first endpoint so that the participant will only receive invitations at the second endpoint.

Some instant messaging services allow a participant to be simultaneously registered with multiple endpoints. In such cases, the service typically designates one endpoint as the active endpoint that will receive invitations. Such services typically do not designate an endpoint as the active one until a participant has performed some activity at that endpoint such as moving the mouse or typing on the keyboard. In the example of a knowledge worker leaving her desktop to go to a meeting with a laptop, she may miss important communications during the time prior to her first use of the laptop since she will still be considered by the instant messaging service to be active at her desktop computer even though the laptop would be the best endpoint on which to reach her. For some endpoints such as mobile phones, determining when a participant is active can be difficult since a participant is frequently carrying his phone but is not using it.

It would be desirable to have a system that would allow a user to be registered with a real-time conversation system on multiple computing systems simultaneously and to receive incoming communications on any of the systems.

SUMMARY

A method and system for accepting invitations sent to multiple endpoints for an instant messaging participant is provided. The acceptance system allows multiple endpoints of a participant to be registered at the same time with an instant messaging service. When an inviting participant wants to establish a conversation with the receiving participant, the endpoint of the inviting participant sends an invitation to the instant messaging service indicating that the receiving participant is to be invited to establish a conversation with the inviting participant. When the instant messaging service receives the invitation, it detects that the receiving participant has multiple endpoints registered and forwards the invitation to each registered endpoint. When an endpoint receives the invitation request, it displays an information window asking whether the receiving participant wants to accept the invitation. If the receiving participant accepts the invitation at an endpoint, the endpoint sends an acceptance to the endpoint of the inviting participant to establish the conversation between that endpoint and the endpoint of the inviting participant.

DETAILED DESCRIPTION

Figure 1:
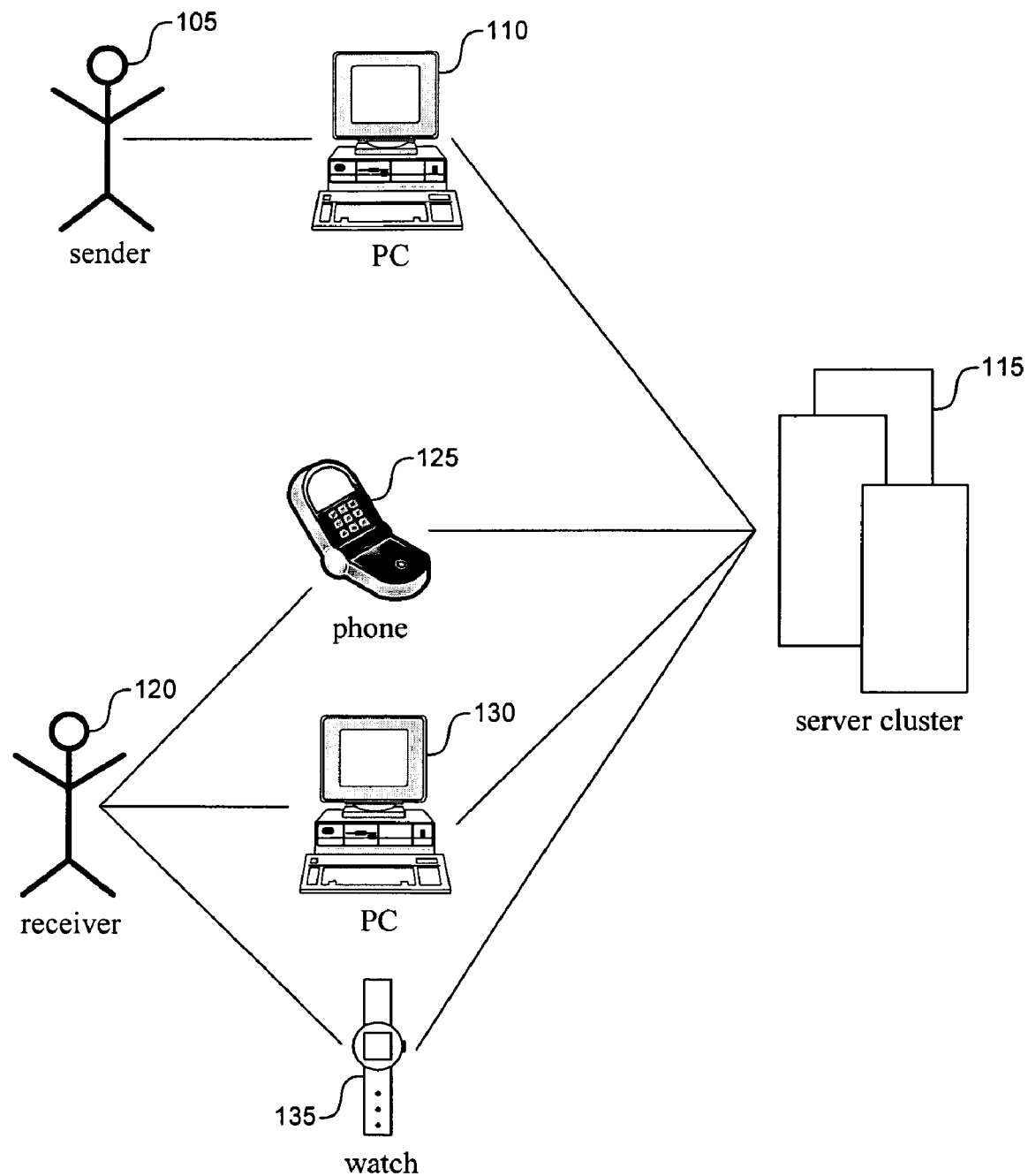
FIG. 1 illustrates a typical scenario with multiple registered instant messaging endpoints.

A method and system for accepting invitations sent to multiple endpoints for an instant messaging participant is provided. In one embodiment, the acceptance system allows multiple endpoints of a participant to be registered at the same time with an instant messaging service. When an inviting participant wants to establish a conversation with the receiving participant, the endpoint of the inviting participant sends an invitation to the instant messaging service indicating that the receiving participant is to be invited to establish a conversation with the inviting participant. When the instant messaging service receives the invitation, it detects that the receiving participant has multiple endpoints registered and forwards the invitation to each registered endpoint. When an endpoint receives the invitation request, it displays an information window asking whether the receiving participant wants to accept the invitation. If the receiving participant accepts the invitation (or takes some other action) at an endpoint, the endpoint sends an acceptance to the endpoint of the inviting participant to establish the conversation between that endpoint and the endpoint of the inviting participant. The acceptance (or other action) by the receiving participant at an endpoint indicates that the receiving participant is present at that endpoint. If, however, the receiving participant does not respond to the information window within a certain time, the information window is removed and each endpoint automatically determines whether to accept the invitation using presence or other information. In this way, a conversation can be established with the registered endpoint at which the receiving participant is present.

In one embodiment, when multiple endpoints of the receiving participant are registered, the acceptance system forks an incoming invitation to each of the endpoints as specified in the SIP protocol. When each endpoint receives the invitation, no endpoint immediately accepts the invitation because it is not yet known at which endpoint the receiving participant can best be reached. Each endpoint displays an information window, called a toast. The toast may display such information as the name of the inviting participant and a subject of the conversation entered by the inviting participant. A participant may respond to a toast in various ways such as accepting it by clicking on it, dismissing it by clicking an X in the upper right corner, or ignoring it in which case it disappears after a few seconds. The acceptance system at each endpoint may display the toast for a certain time (e.g., ten seconds) in order to give the receiving participant an opportunity to manually accept the invitation at one of the endpoints. A manual acceptance by the receiving participant is a reliable indication of the participant's preferred endpoint for the conversation. In some embodiments, dismissing the toast is also a reliable indication because even by dismissing the toast the participant has indicated their presence at a certain endpoint. In general, the acceptance system can consider any response to the toast as a reliable indication of user presence.

In some embodiments, the acceptance system automatically selects an endpoint to accept the invitation when a user does not manually accept the invitation after the certain time. Each endpoint of the receiving participant examines the presence information of each of the other endpoints and individually determines which endpoint should accept the invitation (e.g., which endpoint recorded the most recent user activity). To make this determination, each of the endpoints subscribes to the presence information of each of the other endpoints such that any endpoint for a participant knows the status of any other endpoint. In some embodiments, the endpoints subscribe to changes in the algorithm used to determine the endpoint that should accept the invitation. For example, the endpoints may download the algorithm from the presence server so that the algorithm used can be dynamically changed by an administrator. For example, each endpoint may register to receive the presence information of the server, which publishes the current algorithm as part of its presence information. Alternatively, the algorithm may be published using a conventional publish/subscribe system that is not presence based. If two endpoints try to accept an invitation (e.g., because each believes it has the most recent user activity as a result of a delay in publishing presence information), each will send an acceptance message to the instant messaging service creating a race condition. In some embodiments, the service chooses the endpoint whose acceptance message was received first as the endpoint that wins the race, and discards the other endpoint's acceptance message.

The instant messaging system may allow the inviting participant to enter messages before receiving an acceptance to the invitation. An instant messaging conversation, however, can only occur after an invitation has been sent and accepted, and in embodiments where no instant messaging endpoint immediately accepts the invitation, the inviting participant's instant messaging endpoint queues messages entered by the inviting participant before an invitation is accepted and sends these messages when a response to the invitation is finally received, thereby allowing entry of messages before acceptance.

In some embodiments, the acceptance system allows a conversation to continue even though a receiving participant closes the conversation window in the middle of the conversation. For example, a person may leave his desktop, close the conversation window, and take his mobile phone expecting to continue the conversation. Because the receiving participant has terminated the previous conversation, a new conversation needs to be initiated. In some embodiments, the service recognizes when an inviting participant sends a message after the conversation has been terminated and sends an invitation to each of the receiving participant's registered endpoints for acceptance using the methods discussed above. When an endpoint accepts the invitation, the service sends the inviting participant's message to the receiving participant. Upon receiving the message, the endpoint displays the message in a conversation window. In this way, a terminated conversation can be restarted without the inviting participant being aware of any break in the conversation.

The acceptance system allows older instant messaging endpoints which do not support the automatic acceptance of invitations sent to multiple endpoints to interoperate together with newer endpoints that support this functionality. If the inviting participant is using an older endpoint, waiting ten seconds for the user to manually accept an invitation could cause messages that the user enters before the invitation is accepted to be lost because the older endpoint will not be capable of queuing the messages. In some embodiments, the receiving participant's endpoints recognize that the inviting participant is using an older instant messaging endpoint and skip the ten-second delay. The receiving endpoints then immediately run the automatic acceptance algorithm in order to choose an endpoint to accept the invitation. In some embodiments, an older endpoint is detected by inspecting information sent to the instant messaging service using a SIP extension during the SIP registration process.

When a receiving participant is registered to the instant messaging service with a single instant messaging endpoint, the acceptance system provides a user experience that is similar to the experience when multiple endpoints are registered to avoid confusion. In one embodiment, when an endpoint detects that it is the only registered endpoint for that participant, the endpoint accepts an invitation immediately upon receiving it but does not immediately open a conversation window. Rather, a toast pops up for ten seconds just as when multiple endpoints are registered and the receiving participant is given the opportunity to accept, dismiss, or ignore the toast. If the receiving participant accepts the toast, a conversation window is created for the receiving participant to converse with the inviting participant. If the receiving participant dismisses the toast, a conversation window is still created, but is minimized since the receiving participant has announced their presence but has expressed an interest to not participate in the conversation currently. If the receiving participant ignores the toast, the toast disappears after several seconds and a minimized conversation window is created.

In some embodiments, when only one instant messaging endpoint is registered, that endpoint can determine that it is the only endpoint based on presence information and can immediately accept the invitation. In such a case, the acceptance system can give the receiving participant more context about the conversation by displaying any message that the inviting participant has sent after the immediate acceptance and before the user responds to the toast. In some embodiments, the acceptance system displays in the toast only messages received before the toast is displayed. To increase the opportunity for the inviting participant to send a message before displaying the toast, the acceptance system delays displaying the toast (e.g., for one-half second) to wait for a message to be received. If a message is received, the toast displays the message along with any other context information such as the name of the sender. If after the delay no message has been received, the toast displays the name of the inviting participant and any other available context information.

In some embodiments, the sender can enter a message and send it with the invitation. In such a case the acceptance system can give the receiving participant more context about the conversation by displaying the message in the toast. The inviting participant adds a header "ms-text-format" to the invitation that indicates that the inviting participant supports sending a message in the invitation and that contains formatted text to display in the toast at the receiving participant's registered endpoints. In some embodiments, if the accepting endpoint displayed the message in the toast, the endpoint adds a header "Supported: ms-text-format" to the acceptance message so that the inviting participant's endpoint can determine whether to resend the message once the conversation is formed.

In some embodiments, the acceptance system throttles presence updates from a receiving participant that frequently switches between two instant messaging endpoints. For example, a receiving participant may have two personal computers, one on which they are checking sports scores and another on which they are typing a paper. As the receiving participant switches back and forth between one endpoint and the other, their presence information is being continuously updated as to which of the two endpoints is the most active. This can create an undesirable amount of network traffic to the instant messaging service and to each of the other subscribed instant messaging endpoints. In some embodiments, the instant messaging service stops sending presence updates to subscribed endpoints after a certain amount of switching between two endpoints of the receiving participant. This reduces the bandwidth used and the sending of unnecessary presence information since the receiving participant can be reached at either endpoint and neither endpoint is more active than the other for instant messaging purposes.

FIG. 1 illustrates a typical scenario with multiple registered instant messaging endpoints. An inviting participant 105 is using a personal computer 110 or other computer system which is connected to an instant messaging server 115. A receiving participant 120 is also using a computer that is connected to the instant messaging server 115. The receiving participant has a phone 125, personal computer 130, and wristwatch 135, all of which are running instant messaging endpoints registered with the server, and any of which the receiving participant 120 can use to participate in conversations. When the inviting participant wants to establish a conversation with the receiving participant, the inviting participant's endpoint sends an invitation to the server, which forwards the message to each of the registered endpoints of the receiving participant.

Figure 2:
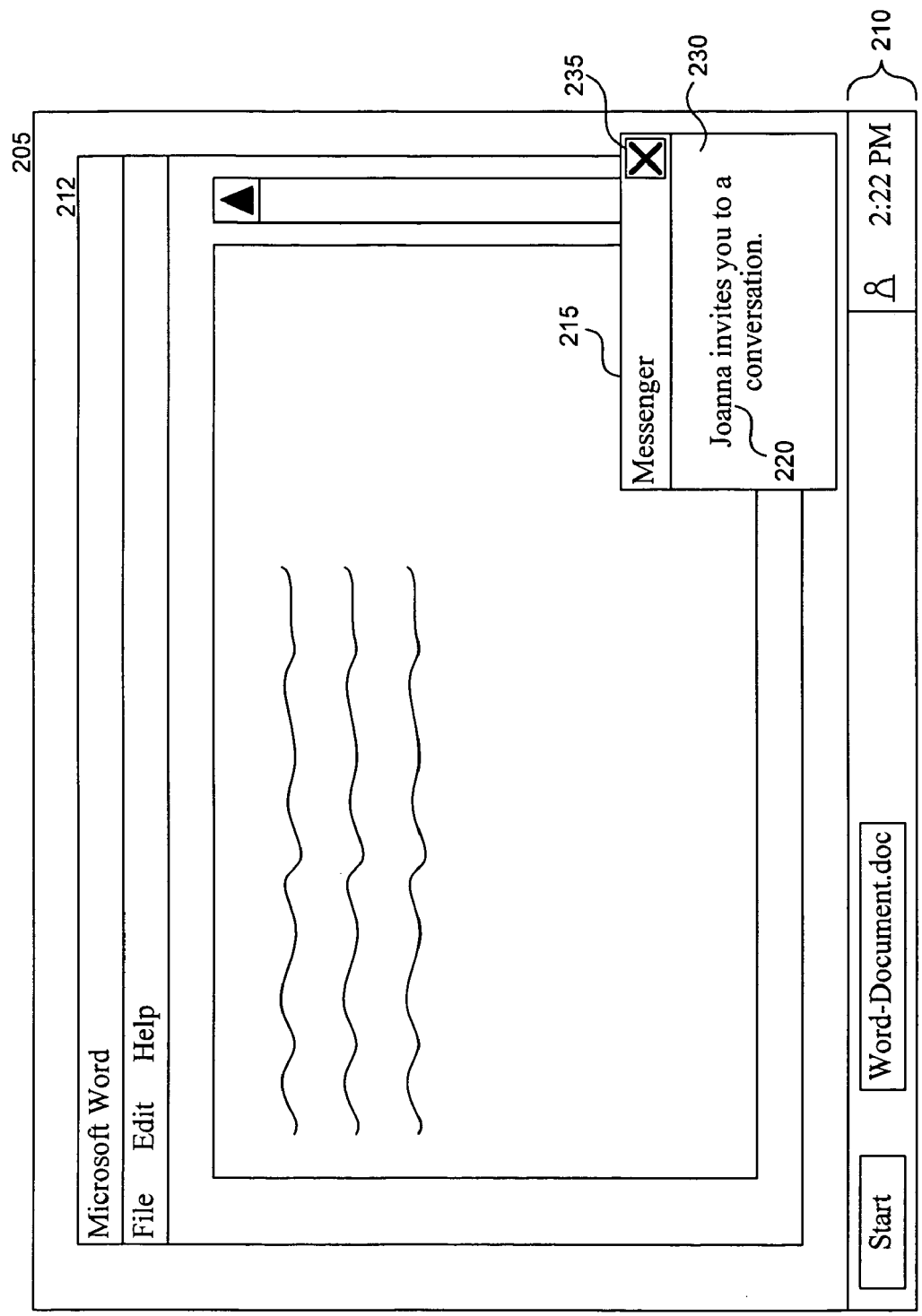
FIG. 2 illustrates a user interface for an invitation notification in one embodiment.

FIG. 2 illustrates a user interface for an invitation notification in one embodiment. The receiving participant's desktop 205 contains a task bar 210, an application window 212 for an unrelated application in which the receiving participant is working, and a toast 215, which has risen from the taskbar 210. The toast contains information about an inviting participant 220 that has invited the receiving participant to a conversation. The toast contains a client area 230, which can be clicked on to accept the invitation and a close button 235 which can be used to dismiss the toast 215. If the toast is accepted, a conversation window is created so that the receiving participant can see messages from the inviting participant and send messages to the inviting participant. If the toast is dismissed, a conversation window is still created but is minimized since the receiving participant has indicated their presence at this endpoint but does not currently want to participate in the conversation. If the toast is ignored, then no conversation window is created and the toast disappears after a certain time.

Figure 3:
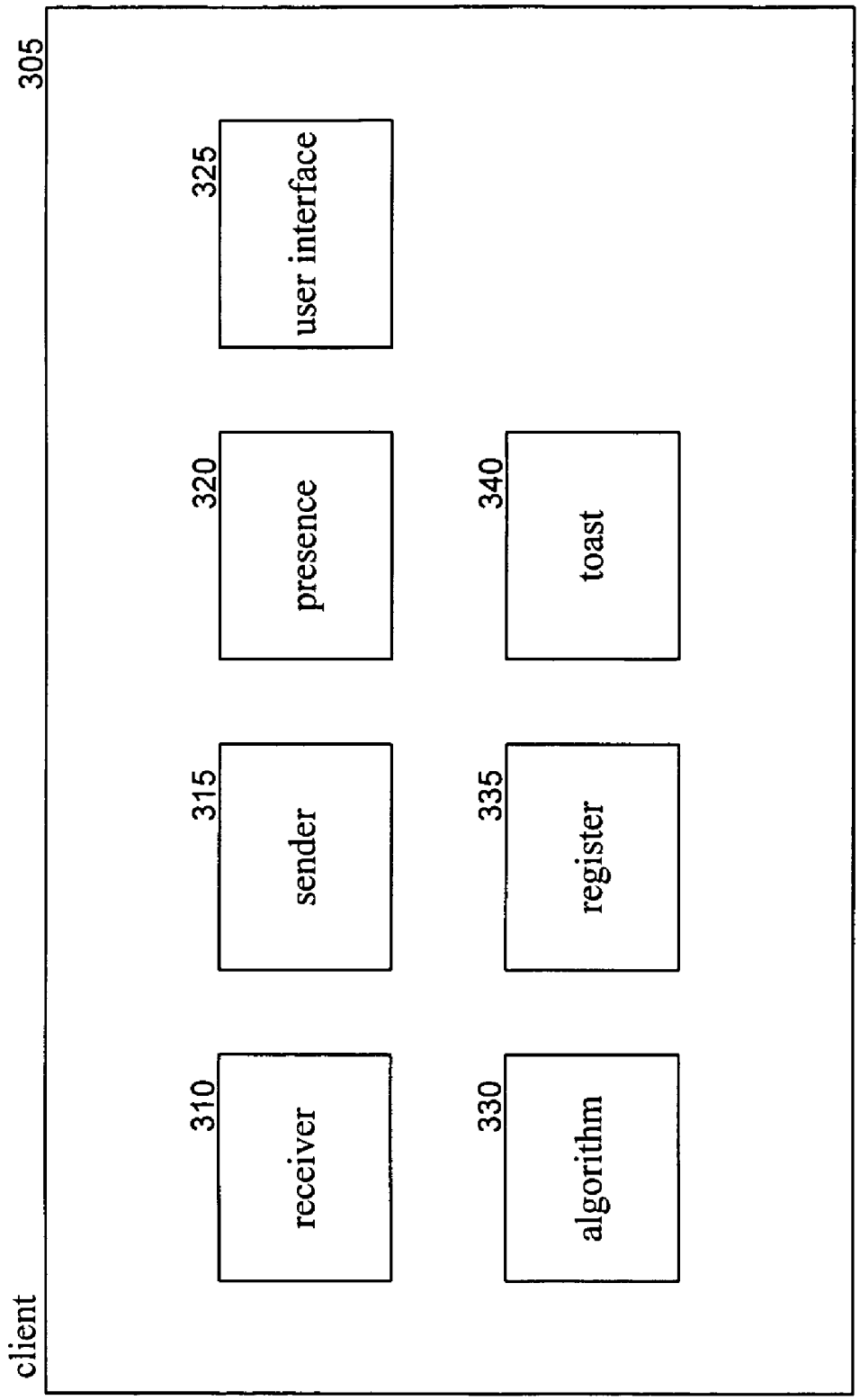
FIG. 3 is a block diagram that illustrates components of an instant messaging endpoint in one embodiment.

FIG. 3 is a block diagram that illustrates components of an instant messaging endpoint in one embodiment. An endpoint 305 contains a SIP receiver component 310, a SIP sending component 315, a SIP registration component 335, a presence component 320, a user interface component 325, an acceptance algorithm component 330, and a toast generation component 340. The SIP receiver component 310 handles incoming messages. The SIP sending component 315 sends outgoing messages to other participants. The SIP registration component 335 registers the endpoint with the instant messaging server. The presence component 320 maintains the endpoint's presence information with the server for subscriptions from other participants. The user interface component 325 displays conversation windows and other user interface elements to the receiving participant for interaction with the endpoint. The acceptance algorithm component 330 determines whether the endpoint should accept a particular invitation. The toast generation component 340 displays toast notifications to the receiving participant.

The computing device on which the system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
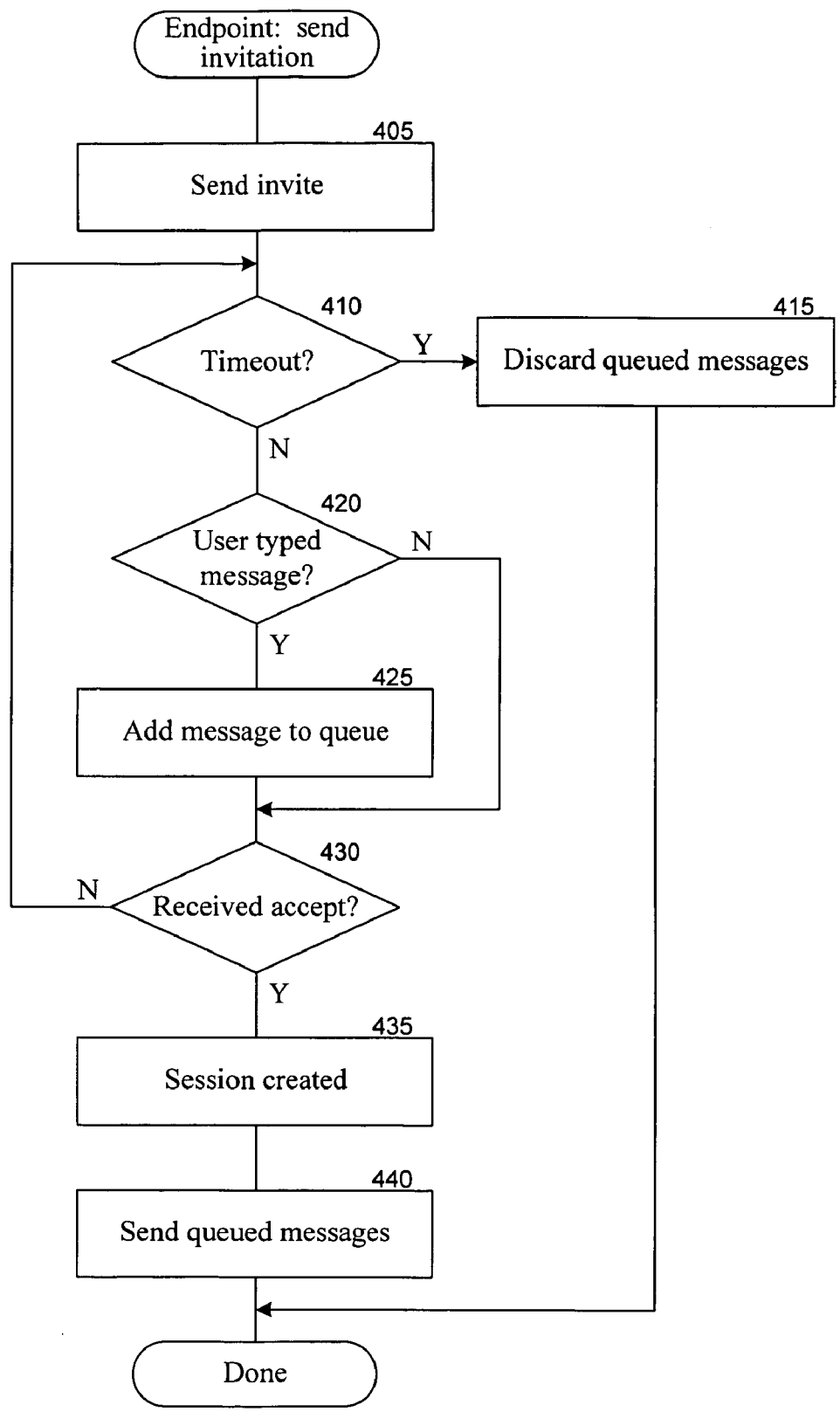
FIG. 4 is a flow diagram that illustrates the processing of a send invitation component of an endpoint in one embodiment.

FIG. 4 is a flow diagram that illustrates the processing of a send invitation component of an endpoint in one embodiment. The component is invoked when an inviting participant sends an invitation to a receiving participant. In block 405, the component sends an invitation to a receiving participant. In decision block 410, if the sending endpoint has not yet timed out waiting for an acceptance to the invitation from one of the receiving participant's endpoints, then the component continues at block 420, else the component continues at block 415. In block 415, the sending endpoint discards any queued messages, cancels the invitation, and completes. In decision block 420, if the inviting participant has typed a message, then the component continues at block 425, else the component continues at block 430. In block 425, the sending endpoint adds the message to a queue. In decision block 430, if the sending endpoint has not yet received an acceptance to the invitation, then the component loops to block 410, else the component continues at block 435. In block 435, a conversation is created. In block 440, the sending endpoint sends any queued messages to the receiving endpoint that accepted the invitation. The component then completes. If once a conversation is created the conversation gets terminated (such as by the receiving participant closing the conversation window) and the other participant enters another message, the send invitation component is invoked to recreate the conversation.

Figure 5:
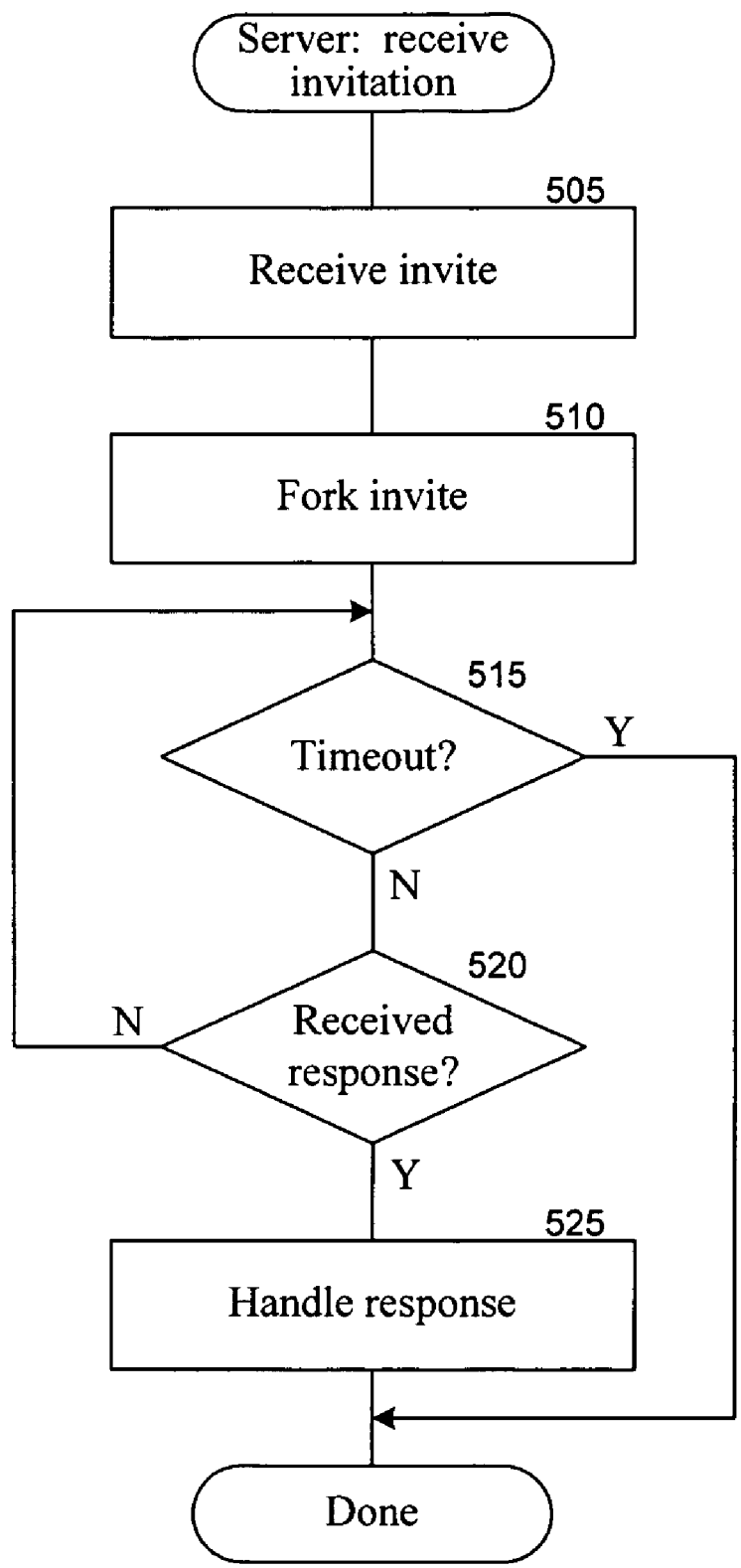
FIG. 5 is a flow diagram that illustrates the steps performed by a receive invitation component of a server in one embodiment.

FIG. 5 is a flow diagram that illustrates the steps performed by a receive invitation component of a server in one embodiment. These steps are invoked when the server receives an invitation from a sending instant messaging endpoint. In block 505, the server receives an invitation from a sending endpoint directed to a receiving participant that is registered with multiple instant messaging endpoints. In block 510, the server forks the invitation to each of the receiving participant's instant messaging endpoints. In decision block 515, if the server has reached a time out waiting for an acceptance from one of the receiving participant's endpoints, then the server completes without sending a response to the endpoint of the inviting participant which results in the endpoint timing out or sends a message indicating that the invitation was not accepted, else the server continues at block 520. In decision block 520, if the server has received a response from one of the receiving participant's endpoints, then the server continues at block 525, else the server loops to block 515. In block 525, the component handles the received response. If the response is a 4xx response as defined in the SIP RFC, the server will wait for responses from all registered endpoints. Endpoints may send a 6xx response to explicitly reject the invitation. If the response is an acceptance, a conversation session is established between the sending endpoint and the receiving participant's endpoint that accepted the invitation. If the instant messaging server receives an acceptance message from one of the receiving participant's other endpoints (indicating that there was a race condition in which both endpoints tried to accept the invitation), the server discards the duplicate acceptance message. The server then completes.

Figure 6:
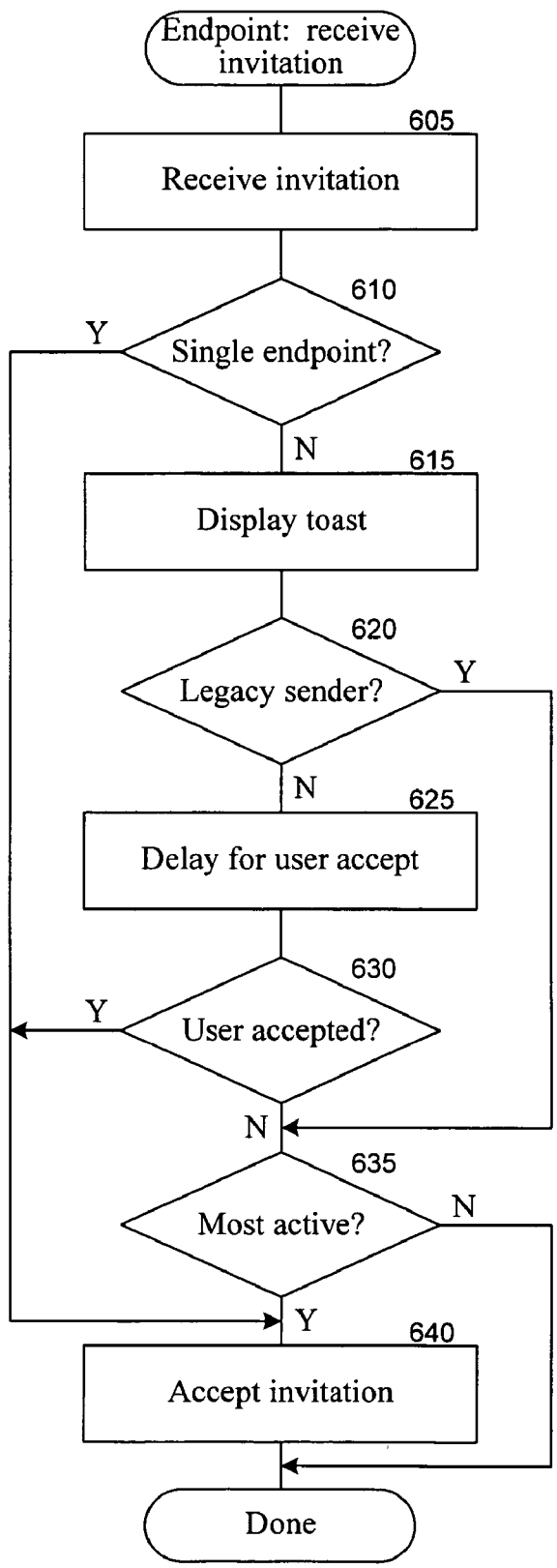
FIG. 6 is a flow diagram that illustrates the steps performed by a receive invitation component of an endpoint in one embodiment.

FIG. 6 is a flow diagram that illustrates the steps performed by a receive invitation component of an endpoint in one embodiment. The component is invoked when an endpoint receives an invitation. In block 605, the endpoint receives an invitation from an inviting participant. In decision block 610, if the receiving participant is not registered at any other endpoint, then the component skips to step 640 and immediately accepts the invitation, else the component continues at block 615. In block 615, the component displays a toast to the user identifying the inviting participant and notifying the user of the received invitation. In decision block 620, if the inviting participant is using a legacy instant messaging endpoint that does not support a receiving participant that is simultaneously registered with multiple endpoints, then the component continues at block 635, else the component continues at block 625. A legacy endpoint can be detected by inspecting a user-agent header in the endpoint's presence information, or by the absence of a custom header such as "Supported: ms-delayed-accept" that may be added to the invitation by non-legacy endpoints. In block 625, the component delays for a certain time to allow the receiving participant to manually accept the invitation at the endpoint. In block 630, if the receiving participant manually accepts the invitation, then the component continues at block 640, else the component continues at block 635. In block 635, if the endpoint is the most active of all of the registered endpoints for the receiving participant, then the component continues at block 640, else the component completes. If the endpoint is not the most active endpoint, it may send an explicit rejection message to decline the invitation. When the receiving participant responds to the toast at one endpoint, then all of the other endpoints will time out and determine that the responding endpoint is most active and will not accept the invitation. In block 640, the component accepts the invitation and establishes a conversation. If the receiving participant is only registered through a single endpoint, then following the immediate acceptance of the invitation the component may still display a toast to provide a similar user experience to the case where multiple endpoints are registered. The component may also delay for a certain time before displaying the toast to allow the inviting participant to enter a message so that more information can be displayed to the receiving participant when the toast is displayed. The receive invitation component then completes.

From the foregoing, it will be appreciated that specific embodiments of the invitation acceptance system have been described herein for purposes of illustration, but that various modifications may be made without deviating from the spirit and scope of the invention. For example, protocols other than SIP can be used for the communication between instant messaging endpoints and servers. Where time-out and delay values have been specified, other values can be used to achieve a similar purpose. Participants may send messages other than text, such as images or other files. Accordingly, the invention is not limited except as by the appended claims.

We claim:

1. A method in a computing system for choosing one of multiple endpoints of a user to accept an invitation for the user to join a conversation, each endpoint being a computing device, the method comprising:
   performing at each of multiple endpoints that are registered with an instant messaging service,
      receiving at the endpoint of the user an invitation to join the conversation, the invitation being received by the instant messaging service and sent to each registered endpoint of the user by the instant messaging service;
      notifying the user of the received invitation by displaying an information window to the user;
      determining at the endpoint whether the endpoint meets an invitation acceptance criterion based on user interaction with the information window, the acceptance criterion being met when the user interacts with the information window within a certain time by either manually accepting the invitation of the information window or manually dismissing the information window;
   when the endpoint determines that it meets the acceptance criterion,
      sending by the endpoint an acceptance to join the conversation;
      creating a conversation window for the conversation;
      when the user interacted with the information window by manually accepting the invitation, displaying the created conversation window so that the user can participate in the conversation; and
      when the user interacted with the information window by manually dismissing the information window, automatically minimizing the created conversation window without displaying the created conversation window wherein the user cannot participate in the conversation while the created conversation window is minimized; and
   when the endpoint determines that it does not meet the acceptance criterion because the user did not interact with the information window within a certain time,
      applying an acceptance algorithm to determine whether the endpoint should accept the invitation, wherein the endpoint subscribes to receive changes in the acceptance algorithm and applies the acceptance algorithm based on received changes to the acceptance algorithm; and
      when the applying indicates that the endpoint should accept the invitation, sending by the endpoint an acceptance to join the conversation.

2. The method of claim 1 wherein each endpoint subscribes to presence information of the other endpoints.

3. The method of claim 1 wherein when a sender of the invitation does not queue messages sent before the invitation is accepted, the endpoint determines whether the acceptance algorithm is met without notifying the user.

4. The method of claim 3 wherein the endpoint determines whether a sender queues messages by inspecting a user-agent property in presence information of the sender.

5. The method of claim 1 wherein the acceptance algorithm indicates that the endpoint that has recorded user activity most recently is to accept the invitation.

6. The method of claim 1 wherein the sender and receiver communicate using the Session Initiation Protocol.

7. The method of claim 1 including when more than one endpoint determines that it meets the acceptance algorithm and sends an acceptance, acceptances received after the first are ignored.

8. The method of claim 1 including a sender of the invitation queues messages entered before the invitation is accepted.

9. A computer-readable storage medium containing instructions for controlling each endpoint of multiple endpoints of a user to accept an invitation for the user to join a conversation, each endpoint being a computing device and being registered with an instant messaging service, by a method comprising:
   receiving at the endpoint of the user an invitation to join the conversation, invitation being sent to each registered endpoint of the user by the instant messaging service;
   notifying the user of the received invitation by displaying at the endpoint an information window to the user so that each endpoint displays an information window;
   determining at the endpoint whether the user interacts with the information window within a certain time;
   when the endpoint determines that the user interacted with the information window within a certain time,
      sending by the endpoint to the instant messaging service an acceptance to join the conversation;
      creating a conversation window for the conversation;
      when the user interacted with the information window by manually accepting the invitation, displaying the created conversation window so that the user can participate in the conversation; and
      when the user interacted with the information window by manually dismissing the information window, minimizing the created conversation window; and
   when the endpoint determines that the user did not interact with the information window in a certain time, applying an acceptance algorithm to determine whether the endpoint should accept the invitation, wherein the endpoint subscribes to receive changes in the acceptance algorithm and applies the acceptance algorithm based on received changes to the acceptance algorithm; and when the application of the acceptance algorithm indicates that the endpoint should accept the invitation, sends to the instant messaging service an acceptance to join the conversation.

10. The computer-readable storage medium of claim 9 wherein when a sender of the invitation does not queue messages sent before the invitation is accepted, the endpoint determines whether the acceptance algorithm is met without notifying the user.

11. The computer-readable storage medium of claim 9 wherein each endpoint subscribes to changes in the acceptance algorithm.

12. The computer-readable storage medium of claim 9 wherein the display of the information window is delayed to wait for a message of the conversation to be received from a sender of the invitation wherein the message is displayed as part of the information window.

13. An endpoint for accepting an invitation for a user to join a conversation, the user having multiple endpoints being computing devices and being registered with an instant messaging service, comprising:

a component that notifies the user of the received invitation by displaying at the endpoint an information window to the user so that each endpoint displays an information window;

a component that receives an invitation to join the conversation, invitation being sent to each registered endpoint of the user by the instant messaging service;

a component that determines whether the user interacts with the information window within a certain time;

a component that when the endpoint determines that the user interacted with the information window within a certain time,
sends to the instant messaging service an acceptance to join the conversation;
creates a conversation window for the conversation;
when the user interacted with the information window by manually accepting the invitation, displays the created conversation window so that the user can participate in the conversation; and
when the user interacted with the information window by manually dismissing the information window, minimizes the created conversation window; and a component that when the endpoint determines that the user did not interact with the information window in a certain time,
applies an acceptance algorithm to determine whether the endpoint should accept the invitation, wherein the endpoint subscribes to receive changes in the acceptance algorithm and applies the acceptance algorithm based on received changes to the acceptance algorithm; and
when the application of the acceptance algorithm indicates that the endpoint should accept the invitation, sends to the instant messaging service an acceptance to join the conversation.

14. The endpoint of claim 13 wherein when a sender of the invitation does not queue messages sent before the invitation is accepted, the endpoint determines whether the acceptance algorithm is met without notifying the user.

15. The endpoint of claim 13 wherein each endpoint subscribes to changes in the acceptance algorithm.

16. The endpoint of claim 13 wherein the display of the information window is delayed to wait for a message of the conversation to be received from a sender of the invitation wherein the message is displayed as part of the information window.

* * * * *